(12) United States Patent
Szabo et al.

(10) Patent No.: US 7,014,220 B2
(45) Date of Patent: *Mar. 21, 2006

(54) LOW PROFILE FLUID QUICK CONNECTOR

(75) Inventors: George Szabo, Ortonville, MI (US); Anthony Thomas, Detroit, MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/962,902

(22) Filed: Oct. 11, 2004

(65) Prior Publication Data

US 2005/0057043 A1    Mar. 17, 2005

Related U.S. Application Data

(63) Continuation of application No. 10/272,347, filed on Oct. 16, 2002, now Pat. No. 6,866,303.

(51) Int. Cl.
*F16L 37/00* (2006.01)

(52) U.S. Cl. ...................................... 285/305; 285/921
(58) Field of Classification Search ................ 285/305, 285/319, 321, 921, 24, 27
See application file for complete search history.

(56) References Cited

U.S. PATENT DOCUMENTS

| | | | |
|---|---|---|---|
| 4,869,534 A | 9/1989 | Ketcham et al. | |
| 5,405,175 A | 4/1995 | Bonnah et al. | |
| 5,542,716 A | 8/1996 | Szabo | |
| 5,683,117 A | 11/1997 | Corbett et al. | |
| 5,730,481 A | 3/1998 | Szabo et al. | |
| 5,782,502 A | 7/1998 | Lewis | |
| 5,863,077 A | 1/1999 | Szabo et al. | |
| 5,951,063 A | 9/1999 | Szabo | |
| 6,142,537 A | 11/2000 | Shimada et al. | |
| 6,155,612 A | 12/2000 | Szabo | |
| 6,186,561 B1 | 2/2001 | Kaishio et al. | |
| 6,234,544 B1 | 5/2001 | Bartholomew | |
| 6,293,596 B1 | 9/2001 | Kinder | |
| 6,431,612 B1 | 8/2002 | Walker | |
| 6,520,546 B1 | 2/2003 | Szabo | |
| 6,540,263 B1 | 4/2003 | Sausner | |

(Continued)

FOREIGN PATENT DOCUMENTS

EP      1 369 634 A1    12/2003

(Continued)

OTHER PUBLICATIONS

European Search Report, May 9, 2005.

*Primary Examiner*—James M. Hewitt
(74) *Attorney, Agent, or Firm*—Young & Basile, P.C.

(57) ABSTRACT

A fluid quick connector sealingly latches first and second components, one of which has a through bore and the other has a raised bead spaced from a tip end. A retainer is mountable through a transverse bore in one end of the first component and latched to the first component by projections carried on a pair of legs. A flange on the retainer is positioned to engage a surface of the first component to position the retainer on the first component. Inner disposed arms on the retainer engage a constant diameter portion of the second component and resist movement of the raised bead into or out of the bore in the housing when the retainer is in a fully latched position. The flange on the retainer is spaced from the legs of the retainer to enable the legs to be of minimal thickness for a reduced axial length for the retainer.

23 Claims, 9 Drawing Sheets

U.S. PATENT DOCUMENTS

| | | |
|---|---|---|
| 6,634,679 B1 | 10/2003 | Stieler |
| 6,866,303 B1 * | 3/2005 | Szabo et al. ................. 285/305 |
| 6,869,110 B1 * | 3/2005 | Okada et al. ................ 285/319 |
| 2002/0084652 A1 | 7/2002 | Halbrook et al. |
| 2004/0061330 A1 | 4/2004 | Okada et al. |
| 2004/0108717 A1 * | 6/2004 | Matsubara et al. ......... 285/330 |
| 2004/0189001 A1 * | 9/2004 | Poder .......................... 285/93 |

FOREIGN PATENT DOCUMENTS

| | | |
|---|---|---|
| GB | 2 077 377 A | 12/1981 |

* cited by examiner

LOW PROFILE FLUID QUICK CONNECTOR

CROSS-REFERENCE TO CO-PENDING APPLICATION

This application is a continuation of co-pending U.S. patent application Ser. No. 10/272,347, filed Oct. 16, 2002, now U.S. Pat. No. 6,866,303, issued Mar. 15, 2005, the entire contents of which is incorporated herein in its entirety.

BACKGROUND

The present invention relates, in general, to fluid quick connectors which couple male and female connector components.

Snap-fit or quick connectors are employed in a wide range of applications, particularly, for joining fluid carrying conduits in automotive and industrial application. Such quick connectors utilize retainers or locking elements for securing a male connector component, such as a tubular conduit, within a complimentary bore of a female connector component or housing. Such retainers are typically of either the axially-displaceable or radially-displaceable type. The terms "axially-displaceable" or "radially-displaceable" are taken relative to the axial bore through the female component.

In a typical quick connector with an axially displaceable, retainer, the retainer is mounted within a bore in a housing of the female connector component of housing. The retainer has a plurality of radially and angularly extending legs which extend inwardly toward the axial center line of the bore in the housing. A tube or male component to be sealingly mounted in the bore in the female component includes a radially upset portion or flange which abuts an inner peripheral surface of the retainer legs. Seal and spacer members as well as a bearing or top hat are typically mounted in the bore ahead of the retainer to form a seal between the housing and the male fitting when the male fitting is lockingly engaged with the retainer legs in the housing.

Radially displaceable retainers are also known in which the retainer is radially displaceable through aligned bores or apertures formed transversely to the main throughbore in the female component housing. Examples of radially displaceable retainers are shown in U.S. Pat. Nos. 5,542,716, 5,730, 481, 5,782,502, 5,863,077 and 5,951,063. The radially displaceable retainer is typically provided with a pair of depending legs which are sized and positioned to slip behind the radially upset portion or flange on the male conduit only when the male connector or conduit is fully seated in the bore in the female component. This ensures a positive locking engagement of the conduit with the female component as well as providing an indication that the conduit is fully seated since the radially displaceable retainer can be fully inserted into the female component only when the conduit has been fully inserted into the bore in the female component.

Regardless of the type of retainer, the female housing or component portion of a fluid connector typically includes an elongated stem having one or more annular barbs spaced from a first end. The barbs provide secure engagement with a hose or conduit which is forced over the barbs to connect the female housing with one end of the conduit.

With transverse mounted, radially displaceable retainers as well as axially mounted retainers, the distance between the axially outer end of the tube bead or flange and the opposite end of the connector housing, in an installed position, is a concern. Typically, the length of the retainer must be long enough to insure a fully inserted position of the tubular member in the housing when the retainer is in the latched position. Further, the length of the retainer must be such to avoid latching of the tubular member in the housing axially ahead of the tube bead.

These features have not been able to be provided in a short length quick connect suitable usable in applications having limited space.

Thus, it would be desirable to provide a low profile fluid quick connector having a reduced axial length which maintains all of the full insertion, high pull-out force resistance features of quick connectors having transversely mounted, radially displaceable retainers.

SUMMARY

The present invention is a low profile fluid quick connector which has a reduced axial length as compared to previously devised fluid quick connectors while still maintaining all of the required quick connector features of full insertion capability and high pull-out force resistance.

The fluid quick connector of the invention is useable with an endform having a radially enlarged flange spaced from a tip end. The quick connector includes a housing having a through bore extending between first and second ends and a transverse bore intersecting the through bore adjacent the first end of the housing. A retainer has first and second spaced legs extending from a central wall, which first and second legs are mountable through the transverse bore in the housing.

Lock members carried on the first and second legs are slidingly engagable with the housing when the retainer in mounted in the housing. The lock members are engagable with two distinct portions of the housing to define a temporary, shipping position allowing full insertion of the endform into the bore in the housing and a fully latched position locking the endform in a sealed condition in the housing.

First and second arms are formed on the body interiorly of the first and second legs. The first and second arms are spaced apart a distance less than an outer diameter of the annular flange on the end form to block the flange on the endform from separating from the housing.

In one aspect of the invention, at least one flange is carried on the retainer and slidingly engagable with the housing when the retainer is coupled to the housing. The at least one flange, which in another aspect of the invention is two laterally spaced flanges, is engagable with an exterior surface of the housing to position the first and second arms on the retainer in an axial position with respect to the housing to prevent contact between a seal member mounted within the bore in the housing and a tip end of the endform in the event that the retainer is in the fully latched position prior to insertion of the endform into the bore in the housing. This non-seal insertion blocking feature is provided with a minimal axial overall length of the retainer which reduces the overall length of the housing to facilitate use of the present connector in restricted space applications.

In one aspect, the at least one flange or pair of flanges is formed on an end portion of the retainer and is engagable with an exterior surface at the first end of the housing.

In another aspect, the at least one flange or pair of flanges is carried on the retainer to engage lateral grooves in the exterior of the housing spaced from the first end of the housing.

In another aspect, the present invention is a fluid quick connector formed of a housing and retainer as defined above which is adapted for sealingly and lockingly receiving a tubular endform.

The fluid quick connector of the present invention provides all of the requirements of a fluid quick connector in so far as providing full insertion capability of an endform into the bore in the housing of the quick connector while preventing contact between the endform and the seals mounted within the bore in the housing if the retainer in the fully latched position in the housing prior to insertion of the endform into the bore in the housing. This prevents a false seal indication for the quick connect. At the same time, the fluid quick connector of the present invention has a reduced axial length thereby facilitating its use in applications having restricted space.

BRIEF DESCRIPTION OF THE DRAWING

The various features, advantages and other uses of the present invention will become more apparent by referring to the following detailed description and drawing in which.

DETAILED DESCRIPTION

Figure 1:
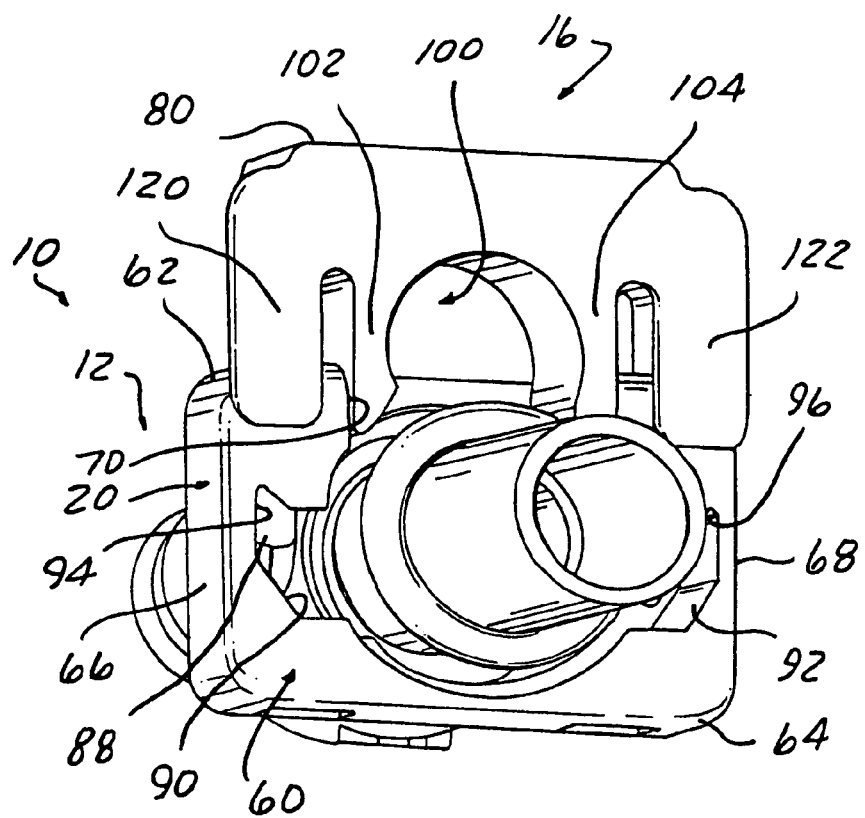
FIG. 1 is a partially exploded, perspective view of one aspect of a quick connector according to the present invention.

Referring to FIGS. 1–11 of the drawing, there is depicted a fluid quick connector 10 suitable for interconnecting two fluid operative elements, such as conduits, tubes, as well as endforms carried on fluid operative devices, such as pumps, fuel filters, valves, valve manifolds, etc.

Thus, the quick connector 10 of the present invention, in the following example, will be incorporated in a first component 12 and a second component 14 which are sealingly joinable and held in a sealed, locked position by a retainer means 16. Each of the first and second components 12 and 14, as described above, may be formed as the end portion or endform of a fluid operative device, such as a conduit, pump, fuel filter, etc., or as separate elements each of which receives and is fluidically coupled to a fluid operative device, such as a conduit by means of conduit retention barbs, etc.

The particular shape of the endform of the first and second components 12 and 14 can be integrally formed on the end of an elongated metal or plastic tube or on a stem extending outward from a fluid use device.

Figure 10:
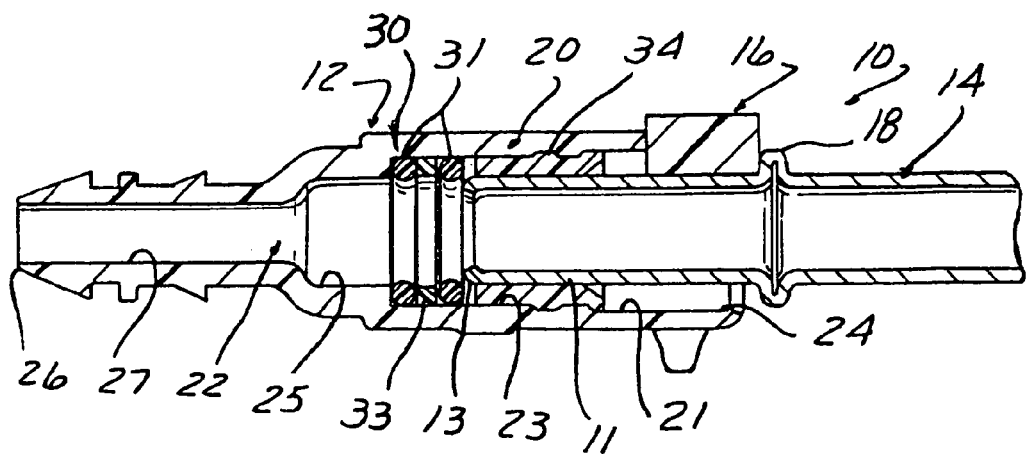
FIG. 10 is a generally cross-sectional view, taken along line 10—10 in FIG. 9.

The first component 12 includes a housing 20 having an elongated, axially extending, internal stepped bore 22, shown in detail in FIG. 10, extending from a large diameter first, open end 24 to a smaller diameter, second open end 26. The stepped bore 22 includes a first bore portion 21 extending from an opening at the first end 24 of the housing 20 to a second smaller diameter second stepped bore portion 23. A third yet smaller diameter stepped bore portion 25 extends axially from one end of the second stepped bore portion 23 and communicates to a still smaller fourth stepped bore portion 27 which extends to the open second end 26 of the housing 20.

As is conventional, a top hat or bearing 34 is mounted in the second stepped bore portion 23 immediately adjacent the end of the first bore portion 21. A seal means 30 is also mounted in the second stepped bore portion 23 between one end of the top hat 34 and the third stepped bore portion 25. The seal means 30 may include one or more O-ring seals 31 spaced by a spacer member 33.

The inner diameter of the first stepped bore portion 21 is sized to slidably receive the outer diameter of the radially enlarged flange or upset bead 18 formed on the male component or fitting 14. Further, the inner diameters of the seal members 31 and 33 and the top hat 34 are sized to sealingly engage the outer diameter of an end portion 11 of the male component 14 extending from a radially enlarged flange 18 to a tip end 13 of the male component 14. The third stepped bore portion 25 has an inner diameter sized to snugly engage the outer diameter of the end portion 11 of the male component 14 when the male component 14 is fully inserted into the stepped bore 22 as described hereafter shown in FIG. 11.

As shown in FIGS. 1 and 5–7, the housing 20 has an enlarged end portion adjacent the first end 24. The enlarged end portion denoted by reference number 60 is enlarged at least in the lateral direction from the outer diameter of the housing 20 surrounding the second bore portion 23. The enlarged end portion 60 is defined by first and second opposed, longer length, major sides 62 and 64 and opposed, intermediate sides 66 and 68, all of which are depicted as having a planar shape, which will be understood to be by example only.

An intermediate aperture, generally in the form of a slot 70 is formed in the enlarged end portion 60 extending inward from the side 62 into the first open end 24 of the housing 20. The opposed edge of the aperture in the first end 24 is closed by the side 64.

Figure 5:
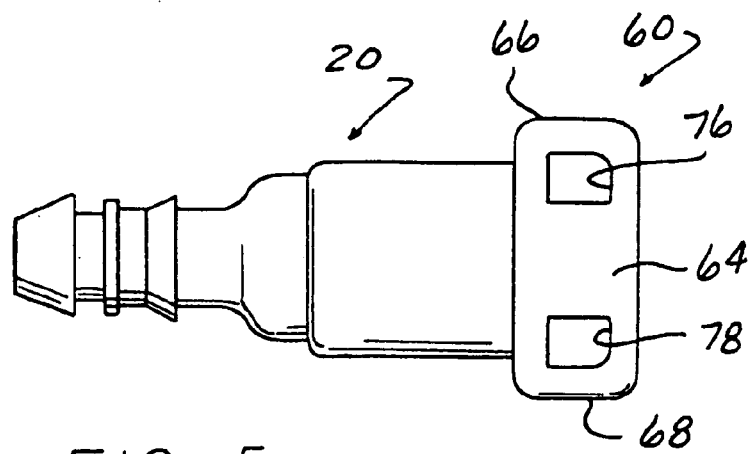
FIG. 5 is a bottom elevational view of the housing of the quick connector shown in FIG. 1.
Figure 6:
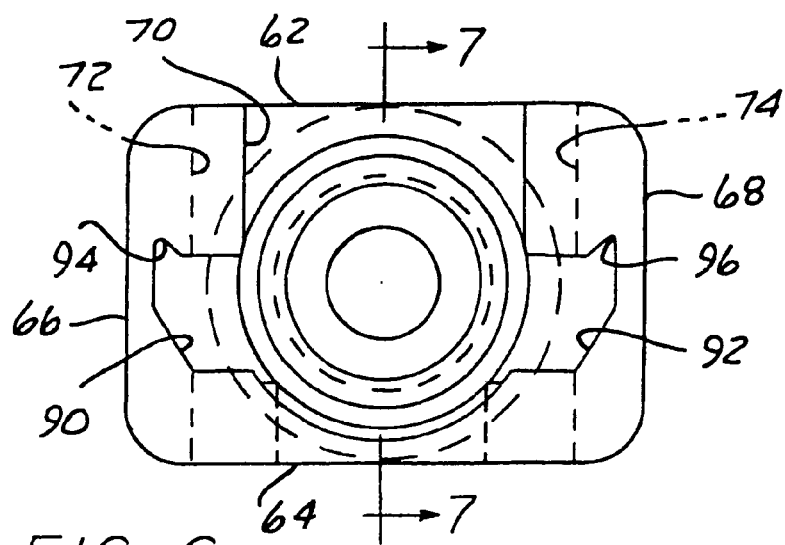
FIG. 6 is an end elevational view of the housing shown in FIG. 1.
Figure 7:
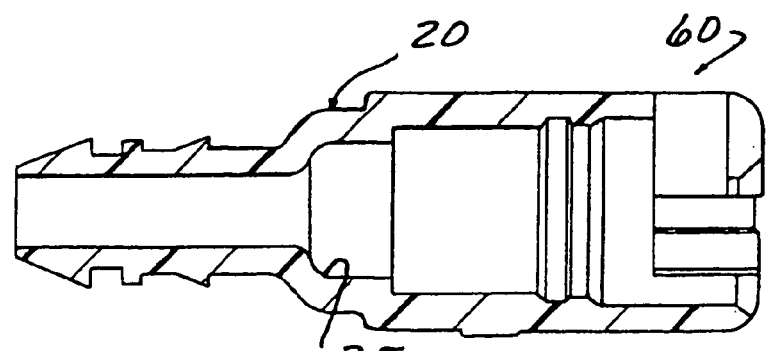
FIG. 7 is a cross-sectional view generally taken along line 7—7 in FIG. 6.
Figure 8:
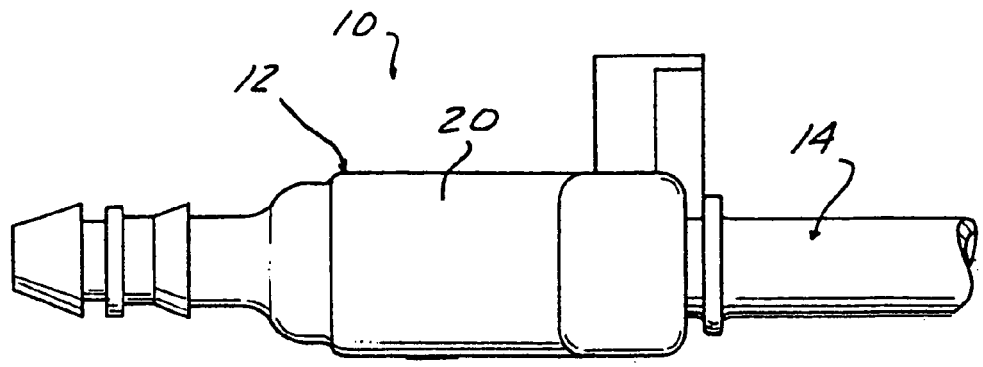
FIG. 8 is a side elevational view of the quick connector depicted in FIG. 1 with the retainer shown in the shipping position and the tube disposed in a non-fully inserted, non-latched position.
Figure 9:
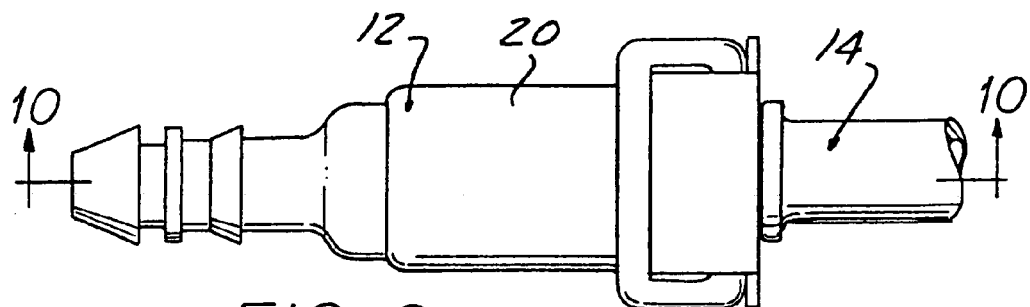
FIG. 9 is a plan elevational view of the quick connector shown in FIG. 8.

As shown in FIGS. 5 and 6, the intermediate sides 66 and 68 project laterally outward from the outer diameter of the adjacent portion of the housing 20. A pair of opposed, internal slots 72 and 74 project through the enlarged end portion 60 to open ends 76 and 78, respectively, in the side 64 as shown in FIG. 5.

A retainer means 16 is by way of example only, depicted as a radially-displaceable retainer having side locking projections. The retainer 16 is preferably formed of a one-piece body of a suitable plastic, such as polyketone, for example. The retainer 16 has an end wall 80 which is characterized by a planar shape, again only by example. First and second side legs 82 and 84 project from the end wall 80 from opposite ends of the end wall 80. A hook-shaped latch projection 86 and 88 is formed adjacent the end of each of the side legs 82 and 84 for latching the retainer 16 to the housing 20 as described hereafter.

As shown in FIG. 6, a pair of axially extending notches 90 and 92 are formed in the enlarged end portion 60 of the housing 20 and extend axially inward from communication with the open first end 24 of the bore 22 substantially through the entire depth of the enlarged end portion 60. The notches 90 and 92 have a receiver end 94 and 96, respectively, formed therein which is complimentary to the shape of the hook-like projections 86 and 88 on the side legs 82 and 84 of the retainer 16. The hook projections 86 and 88 and the notches 90 and 92 cooperate to define a temporary, storage or shipping position for the retainer 16 in the housing 20 as shown in FIGS. 1, 8, 9 and 10. In this position, the retainer 16 is firmly attached to the housing 20 for shipping and storage prior to use. At the same time, the second component 14 may be inserted through the open first end 24 of the housing 20 into a fully inserted, sealed position in the stepped bore 22 in the housing 20 as shown in FIGS. 1 and 11.

If the retainer 16 is further inserted from the temporary shipping position shown in FIG. 1 to a fully inserted position shown in FIG. 10, prior to full insertion of the second component 14 into the bore 22, a radial flange engaging means 100 carried on the retainer 16 will intersect the enlarged bead 18 on the second component 14 and prevent full insertion of the second component 14 into the housing 20.

The radial flange engaging means 100 is defined by a pair of depending arms 102 and 104 which are spaced generally in parallel and extend from the end wall 80 of the retainer 16. Each arm 102 and 104 has an enlarged end 106 and 108 which is adapted to engage the generally constant diameter of the end portion 11 of the second component 14 and be urged radially outward enabling the arms 102 and 104 to slide around and then snap back into registry with the outer diameter of the tubular end 11 of the second component 14. An inner edge 110 between the arms 102 and 104 defines a generally circular cross section having an inner diameter complimentary to the outer diameter of the tubular end 11 of the second component 14. It should be noted that the diameter of the inner edge 110 is smaller than the outer diameter of the raised bead or flange on the second component 14. In this manner, the arms 102 and 104 define a barrier to entry of the raised bead 18 of the second component 14 into the open end 24 of the housing 20, if the retainer 16 is inserted to the fully latched position shown in FIGS. 8, 9 and 10 prior to full insertion of the second component 14 into the bore 22 in the housing 20.

Figure 11:
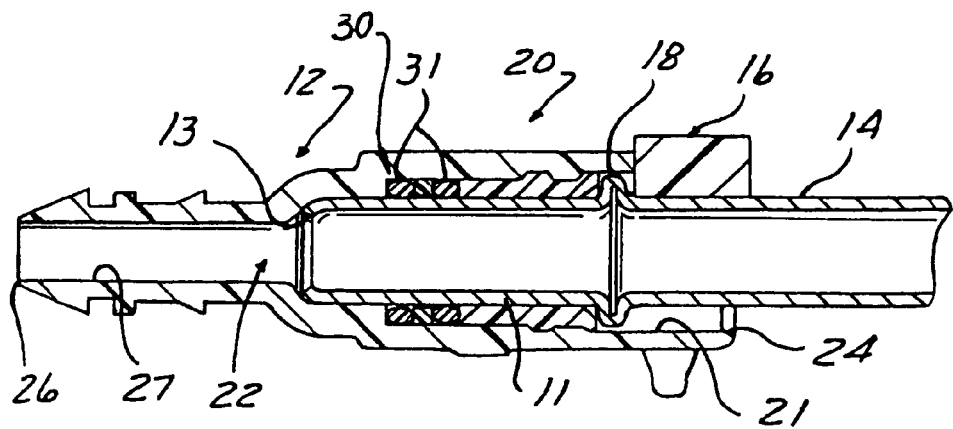
FIG. 11 is a longitudinal cross-sectional view, similar to FIG. 10 of the quick connector, but with the tube endform and the retainer, depicted in the fully latched position.

On the other hand, if the retainer 16 is separate from the housing 20 or in the shipping position shown in FIG. 1, the raised bead 18 on the second component 14 can be inserted through the open end 24 of the bore 22 in the housing 20 to the fully inserted, sealed position shown in FIG. 11. In this position, full insertion of the latch 16 into the housing 20 will enable the hook projections 86 and 88 to slide through the openings 72 and 74 in the enlarged end portion 60 of the housing 20 and through the open ends 76 and 78 to hook around the surrounding portions of the side 64 of the enlarged end portion 60 to lock the retainer 16 in the fully latched position shown in FIG. 11.

Figure 2:
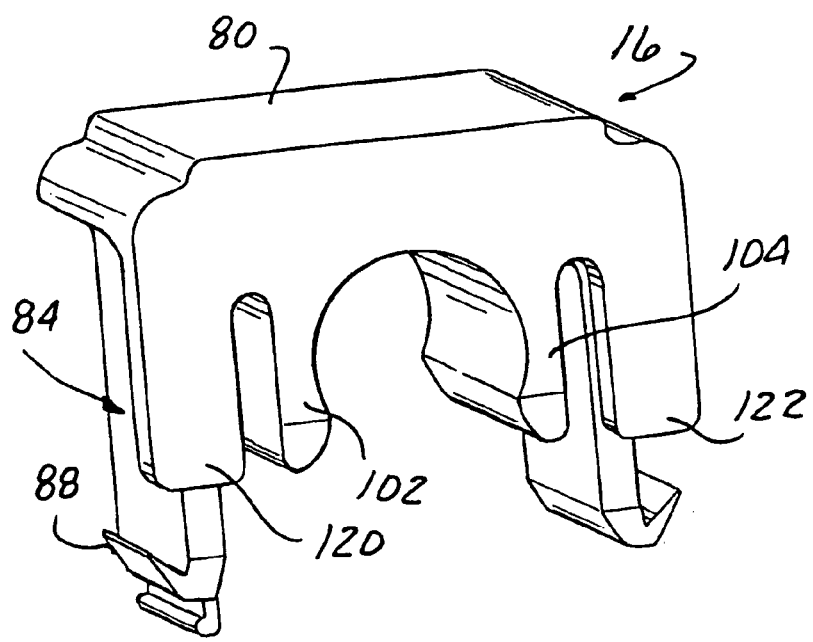
FIG. 2 is a perspective view of the retainer shown in FIG. 1.
Figure 3:
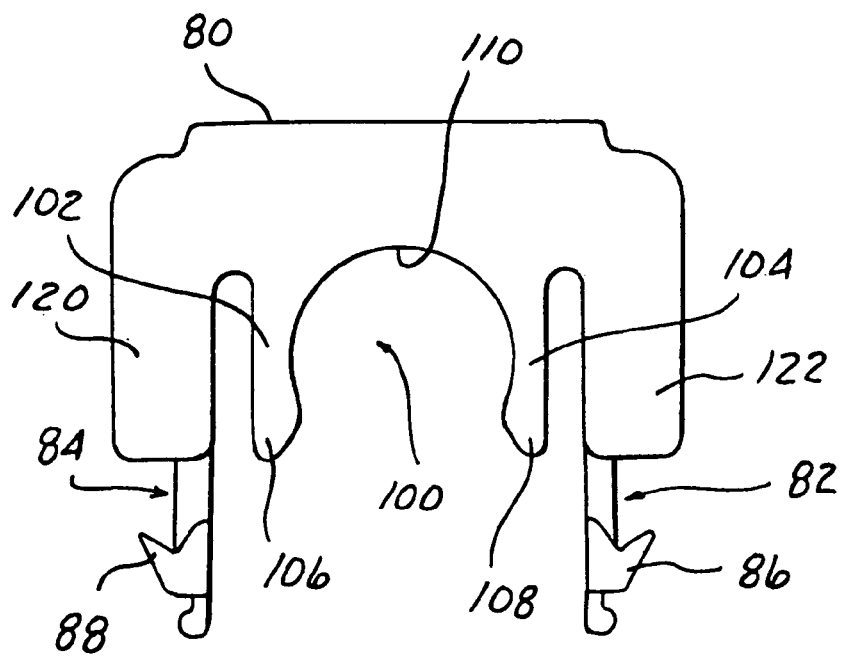
FIG. 3 is an elevational view of one end of the retainer shown in FIG. 2.
Figure 4:
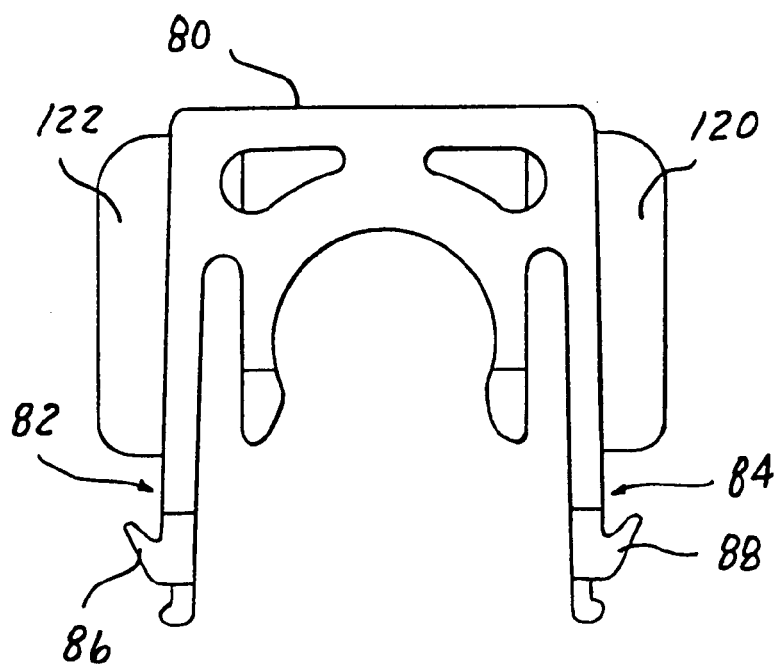
FIG. 4 is an elevational view of the opposite end of the retainer shown in FIG. 2.

The retainer 16 is further maintained in a fixed position on the housing 20 in either the shipping position shown in FIG. 1 or the fully latched position shown in either of FIGS. 10 or 11 by means of a pair of side flanges or wings 120 and 122 which have a narrow thickness and projection or extent from one edge of the wall 80 of the retainer 16 as shown in FIGS. 1 and 2. The side wings 120 and 122 are axially spaced from the side legs 82 and 84 on the retainer 16 by a short distance sufficient to enable the side wings 120 and 122 to be disposed exteriorly of the outer surface of the enlarged end portion 60 as shown in FIG. 1

Referring to FIGS. 12–21 there is depicted another aspect of a fluid quick connector 210 suitable for interconnecting two fluid operative elements, such as conduits, tubes, as well as endforms carried on fluid operative devices, such as pumps, fuel filters, valves, valve manifolds, etc.

The quick connector 210 of this aspect, in the following example, will be incorporated in a first component 212 and a second component 214 which are sealingly joinable and held in a sealed, locked position by a retainer means 216. Each of the first and second components 212 and 214, as described above, may be formed as the end portion or endform of a fluid operative device, such as a conduit, pump, fuel filter, etc., or as separate elements each of which receives and is fluidically coupled to a fluid operative device, such as a conduit by means of conduit retention barbs, etc.

The particular shape of the endform of the first and second components 212 and 214 can be integrally formed on the end of an elongated metal or plastic tube or on a stem extending outward from a fluid use device.

Figure 20:
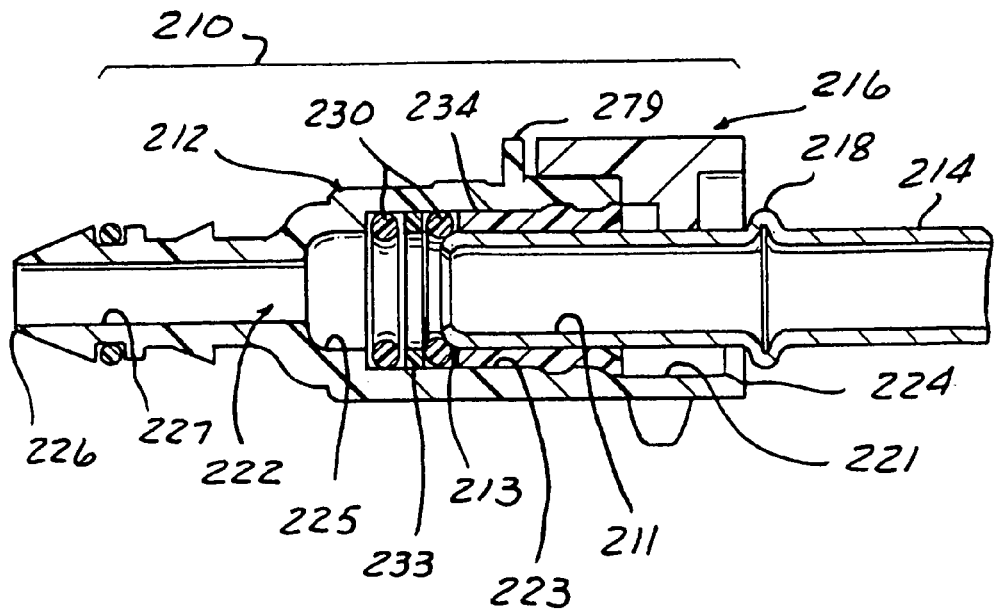
FIG. 20 is a cross-section view generally taken along line 20—20 in FIG. 19.
Figure 21:
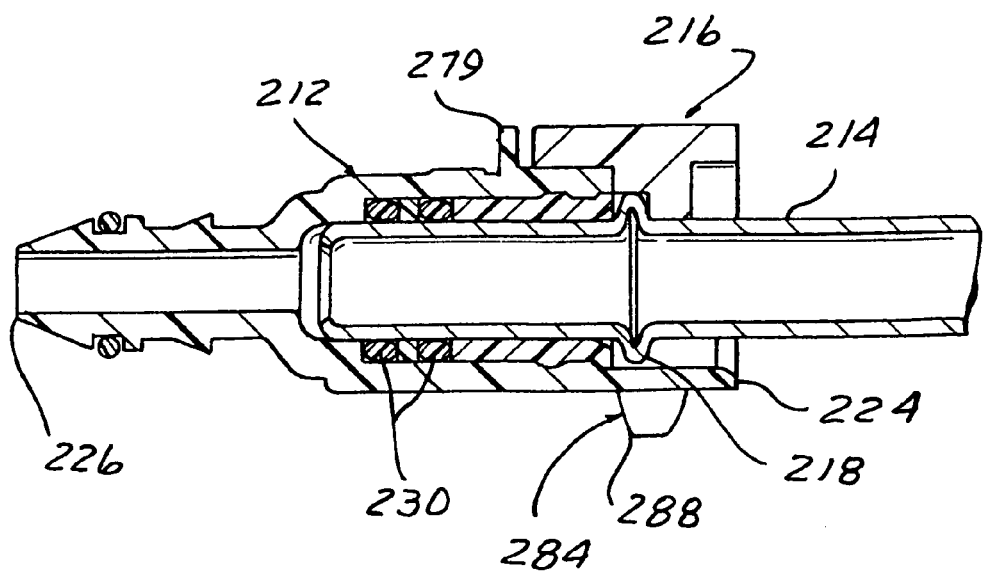
FIG. 21 is a longitudinal cross-sectional view, similar to FIG. 20, but with the tube endform and the retainer depicted in the fully latched position.

The first component 212 includes a housing 220 having an elongated, axially extending, internal stepped bore 222, shown in detail in FIGS. 20 and 21, extending from a large diameter first, open end 224 to a smaller diameter, second open end 226. The stepped bore 222 includes a first bore portion 221 extending from an opening at the first end 224 of the housing 220 to a second smaller diameter second stepped bore portion 223. A third yet smaller diameter stepped bore portion 225 extends axially from one end of the second stepped bore portion 223 and communicates to a still smaller fourth stepped bore portion 227 which extends to the open second end 226 of the housing 220.

As is conventional, a top hat or bearing 234 is mounted in the second stepped bore portion 223 immediately adjacent the end of the first bore portion 221. A seal means 230 is also mounted in the second stepped bore portion 223 between one end of the top hat 234 and the third stepped bore portion 225. The seal means 230 may include one or more O-ring seals 231 spaced by a spacer member 233.

The inner diameter of the first stepped bore portion 221 is sized to slidably receive the outer diameter of the radially enlarged flange or upset bead 218 formed on the male component or fitting 214. Further, the inner diameters of the seal members 231 and 233 and the top hat 234 are sized to sealingly engage the outer diameter of an end portion 211 of the male component 214 extending from a radially enlarged flange 218 to a tip end 213 of the male component 214. The third stepped bore portion 225 has an inner diameter sized to snugly engage the outer diameter of the end portion 211 of the male component 214 when the male component 214 is fully inserted into the stepped bore 222 as described hereafter shown in FIG. 21.

As shown in FIGS. 12 and 15–17, the housing 220 has an end portion 260 adjacent the first end 224. The end portion may be enlarged at least in the lateral direction from the outer diameter of the housing 220 surrounding the second bore portion 223. The end portion 260 is defined by first and second opposed, longer length, major sides 262 and 264 and opposed, intermediate sides 266 and 268, all of which are depicted as having a planar shape, which will be understood to be by example only.

An intermediate aperture, generally in the form of a slot 270, is formed in the end portion 260 extending inward from the side 262 into the first open end 224 of the housing 220. The opposed edge of the aperture 270 in the first end 224 is closed by the side 264.

Figure 15:
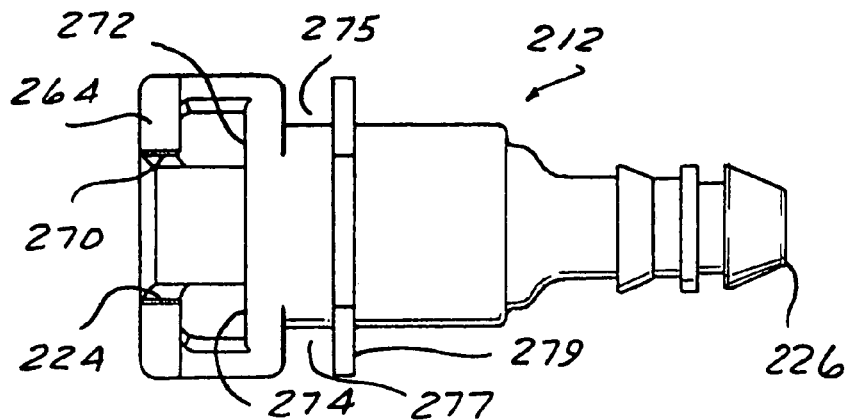
FIG. 15 is a bottom elevational view of the housing of the quick connector shown in FIG. 12.
Figure 16:
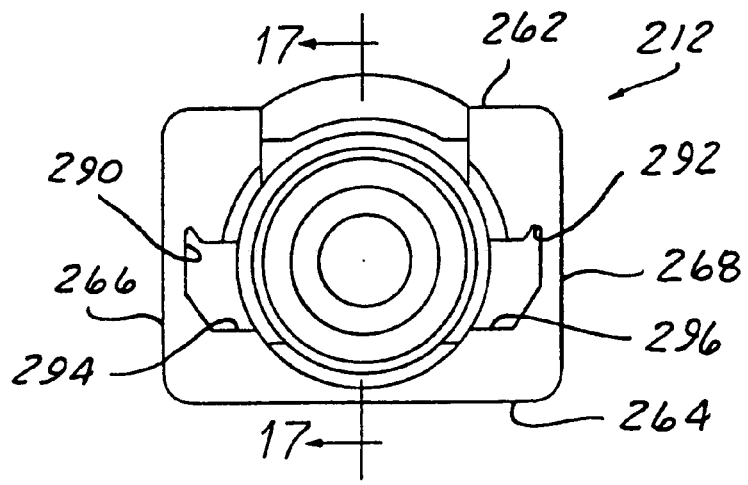
FIG. 16 is an end elevational view of the housing shown in FIG. 12.
Figure 17:
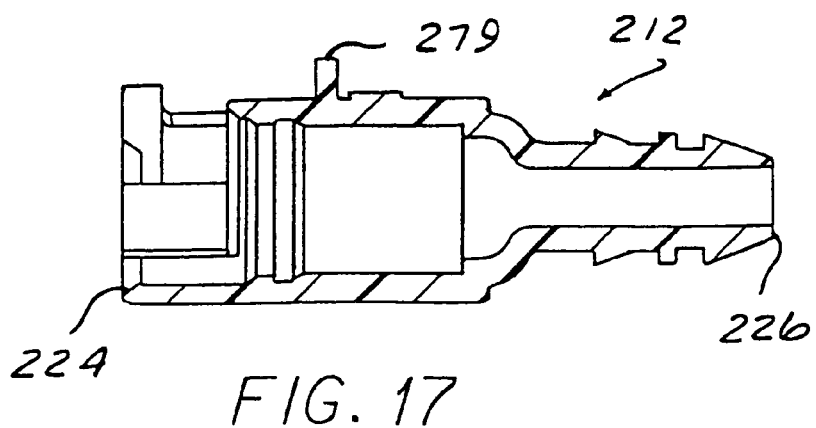
FIG. 17 is a cross-sectional view generally taken along line 17—17 in FIG. 16.

As shown in FIGS. 15 and 16, the intermediate sides 266 and 268 project laterally outward from the outer diameter of the adjacent portion of the housing 220. A pair of opposed, internal slots 272 and 274 project through the end portion 260 to open ends 276 and 278, respectively, in the side 264 as shown in FIG. 15.

As shown in FIGS. 12, 15 and 17–21, the housing 220 has a pair of side, opposed recesses or grooves formed between one end of the end portion 260 of the housing 220 and a flange 279 projecting radially outward from the housing 220 and axially spaced from one end of the enlarged end portion 260.

A retainer means 216, hereafter retainer 216, is by way of example only, depicted as a radially-displaceable retainer having side locking projections. The retainer 216 is preferably formed of a one-piece body of a suitable plastic, such as polyketone, for example. The retainer 216 has an end wall 280 which is characterized by an arcuate shape, again only by example. First and second side legs 282 and 284 project from the end wall 280 from opposite ends of the end wall 280. A hook-shaped latch projection 286 and 288 is formed adjacent the end of each of the side legs 282 and 284 for latching the retainer 216 to the housing 220 as described hereafter.

Figure 12:
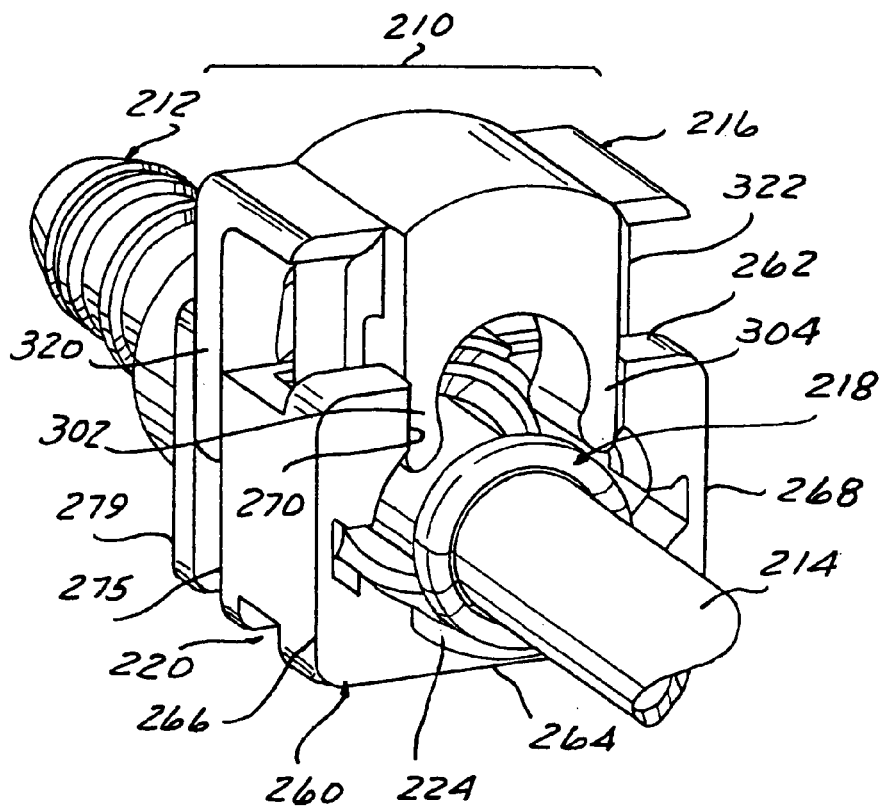
FIG. 12 is a partially exploded, perspective view of another aspect of a quick connector according to the present invention.
Figure 18:
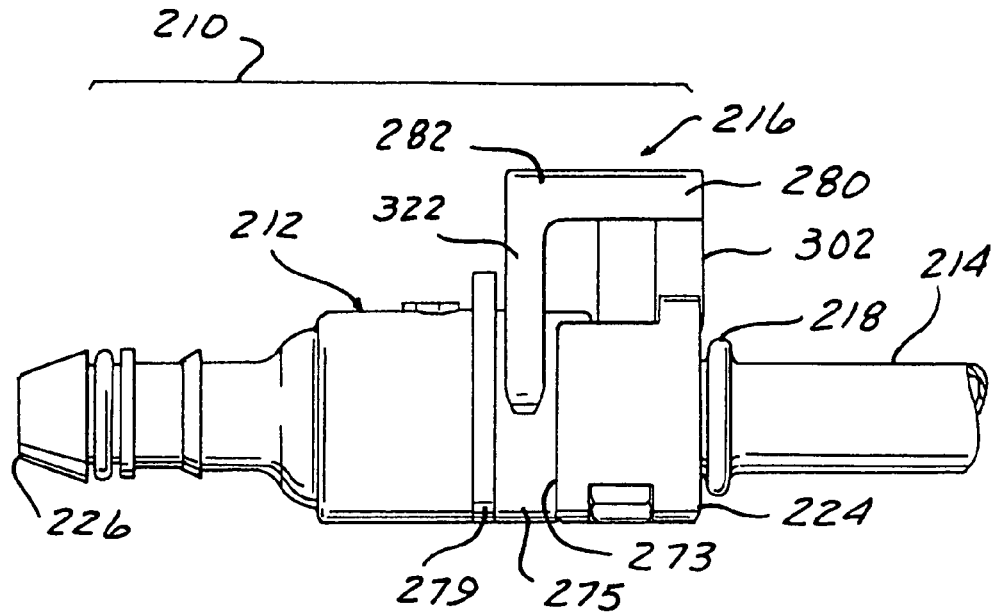
FIG. 18 is a side elevational view of the quick connector depicted in FIG. 1 with the retainer shown in the shipping position and the tube disposed in a non-fully inserted, non-latched position.
Figure 19:
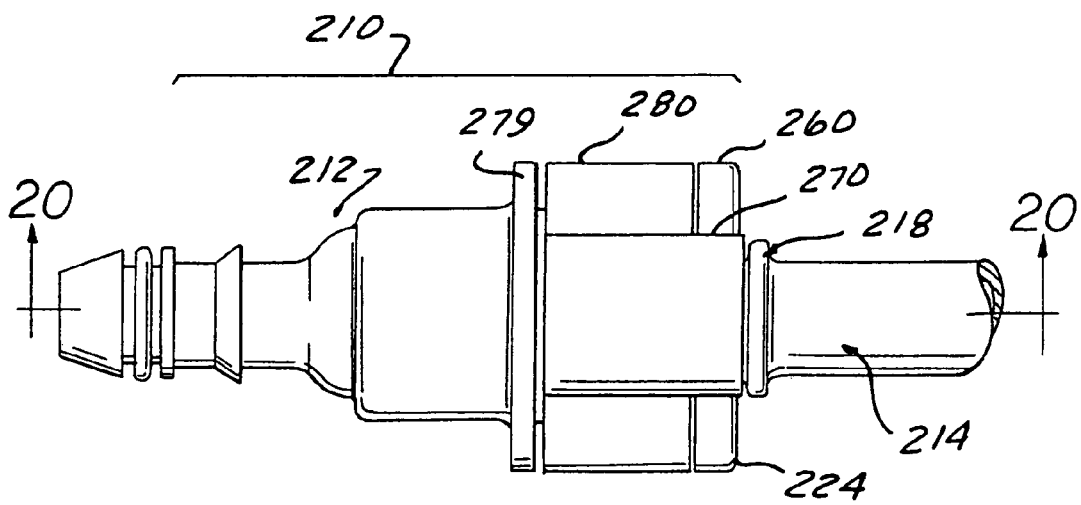
FIG. 19 is a plan elevational view of the quick connector shown in FIG. 18.

As shown in FIGS. 12 and 16 a pair of axially extending notches 290 and 292 are formed in the end portion 260 of the housing 220 and extend axially inward from communication with the open first end 224 of the bore 222 substantially through the entire depth of the enlarged end portion 260. The notches 290 and 292 have a receiver end 294 and 296, respectively, formed therein which is complimentary to the shape of the hook-like projections 286 and 288 on the side legs 282 and 284 of the retainer 216. The hook projections 286 and 288 and the notches 290 and 292 cooperate to define a temporary, storage or shipping position for the retainer 216 in the housing 220 as shown in FIGS. 12 and 18. In this position, the retainer 216 is firmly attached to the housing 220 for shipping and storage prior to use. At the same time, the second component 214 may be inserted through the open first end 224 of the housing 220 into a fully inserted, sealed position in the stepped bore 222 in the housing 220 as shown in FIG. 21.

If the retainer 216 is further axially inserted from the temporary shipping position shown in FIG. 12 to a fully inserted position shown in FIG. 20, prior to full insertion of the second component 214 into the bore 222, a radial flange engaging means 300 carried on the retainer 216 will intersect the enlarged bead or flange 218 on the second component 214 and prevent full insertion of the second component 214 into the housing 220.

The radial flange engaging means 300 is defined by a pair of depending arms 302 and 304 which are spaced generally in parallel and extend from the end wall 280 of the retainer 216. Each arm 302 and 304 has an enlarged end 306 and 308 which is adapted to engage the generally constant diameter of the end portion 211 of the second component 214 and be urged radially outward enabling the arms 302 and 304 to slide around and then snap back into registry with the outer diameter of the tubular end 211 of the second component 214. An inner edge 310 between the arms 302 and 304 defines a generally circular cross section having an inner diameter complimentary to the outer diameter of the tubular end 211 of the second component 214. It should be noted that the diameter of the inner edge 310 is smaller than the outer diameter of the raised bead or flange 218 on the second component 214. In this manner, the arms 306 and 308 define a barrier to entry of the raised bead 218 of the second component 214 into the open end 224 of the housing 220, if the retainer 216 is inserted to the fully latched position shown in FIG. 20 prior to full insertion of the second component 214 into the bore 222 in the housing 220.

On the other hand, if the retainer 216 is separate from the housing 220 or in the shipping position shown in FIG. 1, the raised bead 218 on the second component 214 can be inserted through the open end 224 of the bore 222 in the housing 220 to the fully inserted, sealed position shown in FIG. 21. In this position, full insertion of the latch 216 into the housing 220 will enable the hook projections 286 and 288 to slide through the openings 272 and 274 in the enlarged end portion 260 of the housing 220 and through the open ends 276 and 278 to hook around the surrounding portions of the side 264 of the enlarged end portion 260 to lock the retainer 216 in the fully latched position shown in FIG. 21.

Figure 13:
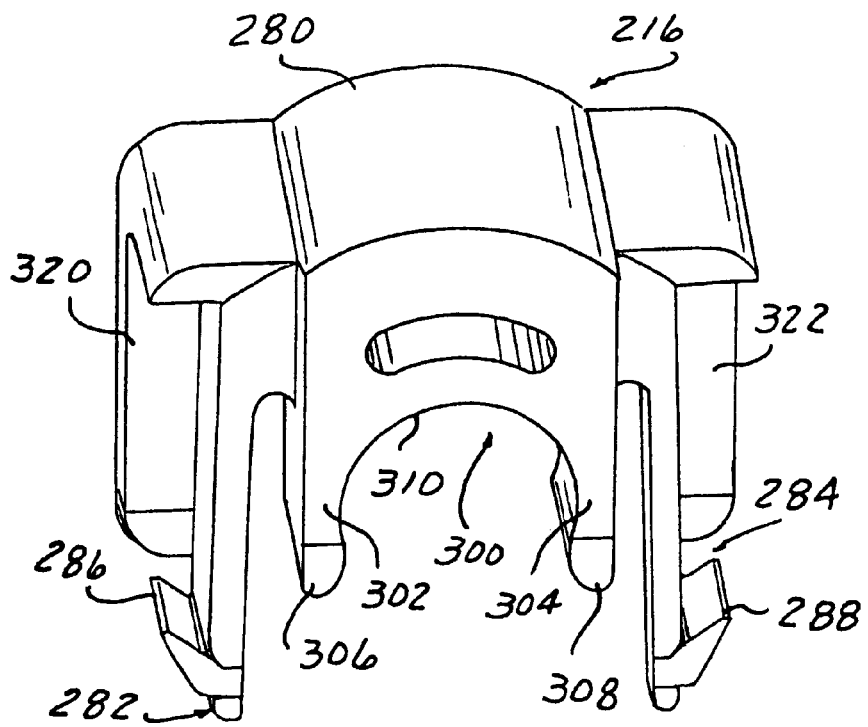
FIG. 13 is a perspective view of the one end of a retainer shown in FIG. 12.
Figure 14:
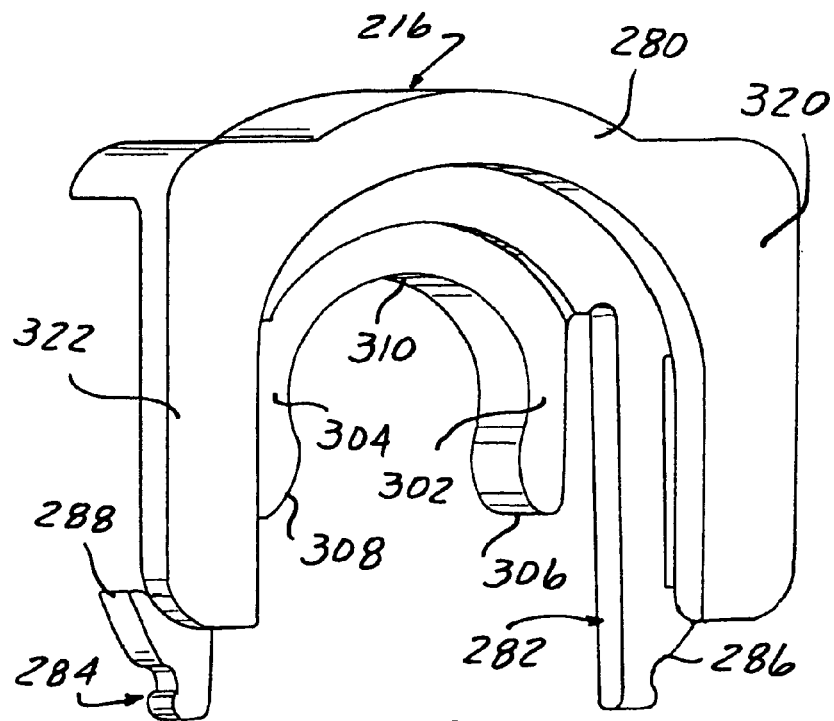
FIG. 14 is a perspective view of the opposite end of the retainer shown in FIG. 12.

The retainer 16 is further axially maintained in a position on the housing 220 in either the shipping position shown in FIG. 12 or the fully latched position shown in either of FIG. 20 or 21 by means of at least one and possibly a pair of flanges 320 and 322 which project or extend from one end of the end wall 280 of the retainer 216 as shown in FIGS. 12, 13 and 14. The flanges 320 and 322 are axially spaced from the side legs 282 and 284 on the retainer 216 to enable the flanges 320 and 322 to engage a shoulder 323 in grooves or recesses 275 and 277 on the housing 220 between the flange 279 and the enlarged end portion 260 in either of the shipping position shown in FIGS. 12 and 18 and the fully latched position.

In summary, there has been disclosed a fluid quick connector which has a reduced axial length thereby enabling the use of a fluid quick connector in applications having confined or limited access space.

What is claimed is:

1. A fluid quick connector comprising:
   an endform having a radially enlarged flange spaced from a tip end;
   a housing having a through bore extending between first and second ends and a transverse bore intersecting the through bore;
   seal means mounted in the through bore for sealing engagement between an inner surface of the through bore and the tip end of the endform;

a retainer having first and second spaced legs extending from a wall, the first and second legs engagable with the housing to releasably latch the retainer to the housing;

first and second arms formed on the retainer interiorly of the first and second legs, the first and second arms spaced apart a distance less than an outer diameter of the flange on the endform; and flange means, carried on the retainer spaced from the first and second legs in a direction along the longitudinal axis of the housing and engagable with an exterior surface of the housing when the retainer is coupled to the housing, for positioning the first and second arms to prevent sealing engagement between the seal means and the tip end of the endform when the retainer is latched to the housing prior to insertion of the endform into the through bore.

2. The quick connector of claim 1 wherein:
the first end of the housing defines an aperture for receiving ends of the first and second arms of the retainer therethrough into a position latching the endform to the housing.

3. The quick connector of claim 1 wherein the housing further comprises:
a surface on the first end of the housing having opposed sides projecting outwardly from the housing; and
an aperture in the surface receiving the first and second arms.

4. The quick connector of claim 3 wherein:
the aperture in the surface on the first end of the housing opens to the transverse bore in the housing.

5. The quick connector of claim 1 wherein:
the first and second arms extend substantially axially between the flange means and the first and second legs.

6. The quick connector of claim 1 further comprising:
means, carried on the first and second legs of the retainer and in the housing, for latching the retainer in a partially inserted position in the transverse bore in the housing, the retainer, when in the partially inserted position, allowing full insertion of the endform into the through bore in the housing.

7. The quick connector of claim 1 wherein the flange means comprises:
two flanges carried on the retainer.

8. The quick connector of claim 7 further comprising:
a shoulder carried externally on the housing, the two flanges engagable with the shoulder.

9. The quick connector of claim 8 wherein:
the shoulder is defined by opposed grooves in the exterior of the housing; and
the flange means is two flanges.

10. The fluid quick connector of claim 1 further comprising:
an open portion of the transverse bore opening through the first end of the housing;
the first and second arms disposed in the open portion of the transverse bore.

11. The fluid quick connector of claim 20 wherein:
the flange means engages the first end of the housing.

12. A fluid quick connector adapted for sealingly receiving an endform having a radially enlarged flange spaced from a tip end, the fluid quick connector comprising:
a housing having a through bore extending between first and second ends and a transverse bore intersecting the through bore;
seal means, mounted in the through bore, for sealing engagement between an inner surface of the through bore and the tip end of the endform;

a retainer having first and second spaced legs extending from a wall, the first and second legs engagable with the housing to releasably latch the retainer to the housing;

first and second arms formed on the retainer interiorly of the first and second legs, the first and second arms spaced apart a distance less than an outer diameter of the flange on the endform; and flange means, carried on the retainer spaced from the first and second legs in a direction along the longitudinal axis of the housing and engagable with an exterior surface of the housing when the retainer is coupled to the housing, for positioning the first and second arms to prevent sealing engagement between the seal means and the tip end of the endform when the retainer is latched to the housing prior to insertion of the endform into the through bore.

13. The quick connector of claim 12 wherein:
the first end of the housing defines an aperture for receiving ends of the first and second arms of the retainer therethrough into a position latching the endform to the housing.

14. The quick connector of claim 12 wherein:
the first and second arms extend substantially axially between the flange means and the first and second legs.

15. The quick connector of claim 14 wherein:
the aperture in the surface on the first end of the housing opens to the transverse bore in the housing.

16. The quick connector of claim 15 wherein the housing further comprises:
a surface on the first end of the housing having opposed sides projecting outwardly from the housing; and
an aperture in the surface receiving the first and second arms.

17. The fluid quick connector of claim 12 wherein:
the flange means engages the first end of the housing.

18. The quick connector of claim 12 further comprising:
means, carried on the first and second legs of the retainer and in the housing, for latching the retainer in a partially inserted position in the transverse bore in the housing, the retainer, when in the partially inserted position, allowing full insertion of the endform into the through bore in the housing.

19. The quick connector of claim 12 wherein the flange means comprises:
two flanges carried on the retainer.

20. The quick connector of claim 12 further comprising:
a shoulder carried externally on the housing, the flange means engagable with the shoulder; and
the flange means being two flanges.

21. The quick connector of claim 20 wherein:
the shoulder defined by opposed grooves in the exterior of the housing; and
the flange means is two flanges.

22. The quick connector of claim 21 wherein the seal means comprises:
at least one seal mounted in the through bore in the housing for sealing engagement with a tip end of an endform.

23. The fluid quick connector of claim 12 further comprising:
an open portion of the transverse bore opening through the first end of the housing;
the first and second arms disposed in the open portion of the transverse bore.

* * * * *